Figure 1:
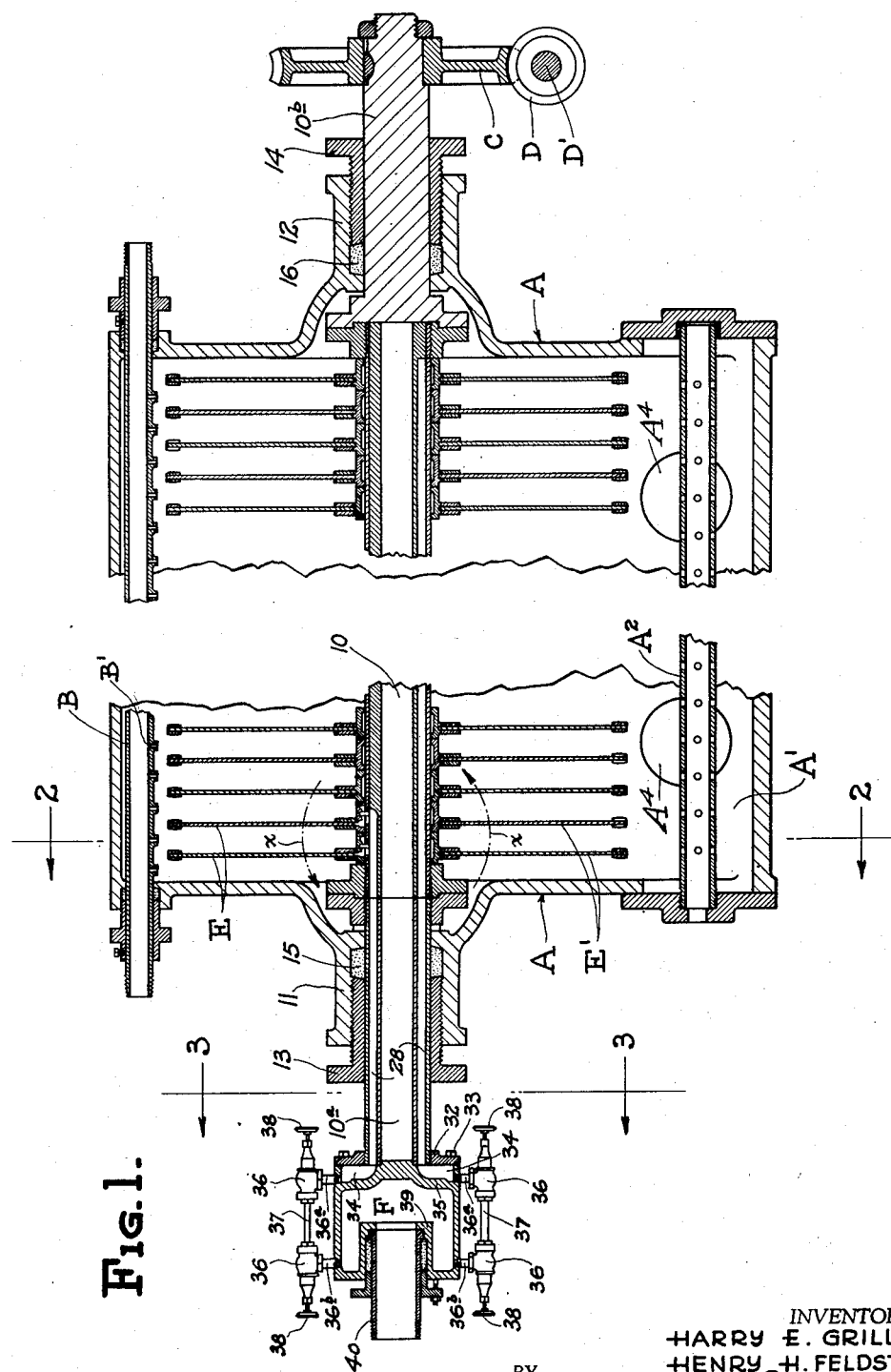

July 9, 1940.  H. E. GRILL ET AL  2,207,618
FILTER
Filed Oct. 6, 1938  4 Sheets-Sheet 1

INVENTORS.
HARRY E. GRILL
HENRY H. FELDSTEIN
BY Hull, Brock & West.
ATTORNEYS.

July 9, 1940.    H. E. GRILL ET AL    2,207,618
FILTER
Filed Oct. 6, 1938    4 Sheets-Sheet 3

INVENTORS.
HARRY E. GRILL
HENRY H. FELDSTEIN
BY Hull, Brock & West.
ATTORNEYS.

July 9, 1940.    H. E. GRILL ET AL    2,207,618
FILTER
Filed Oct. 6, 1938    4 Sheets-Sheet 4
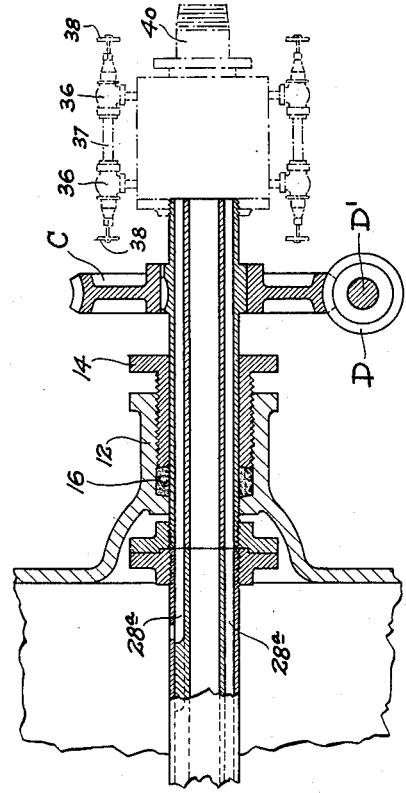
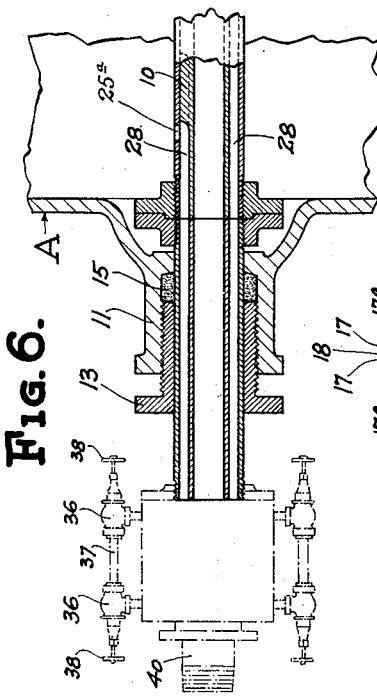
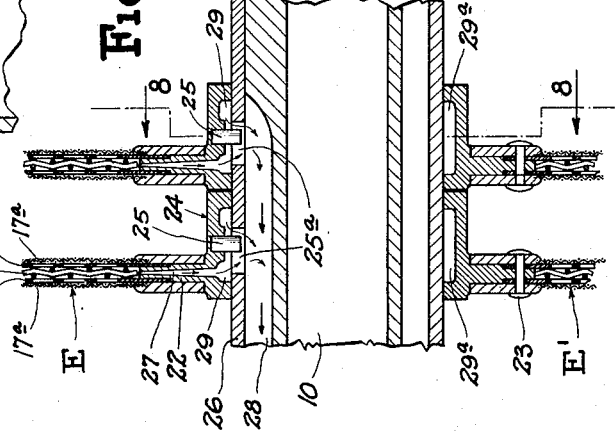
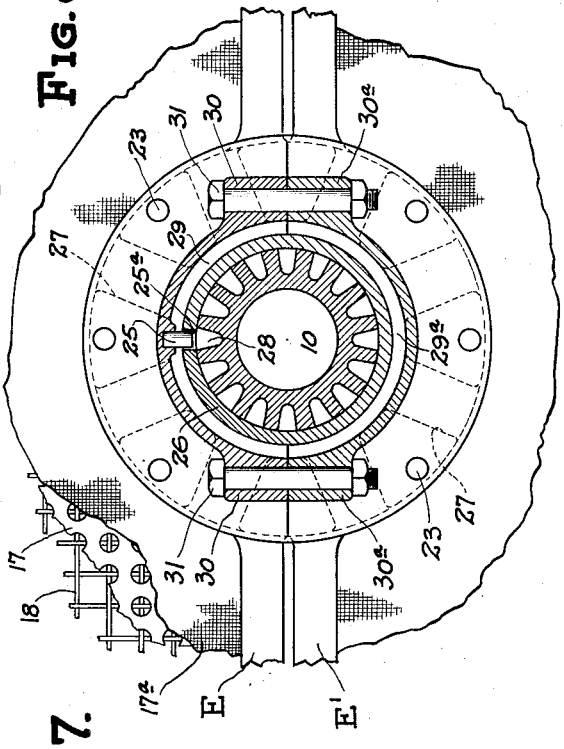
INVENTORS.
HARRY E. GRILL
HENRY H. FELDSTEIN
BY Hull, Brock & West
ATTORNEYS.

Patented July 9, 1940

2,207,618

UNITED STATES PATENT OFFICE 2,207,618

FILTER

Harry E. Grill, Willoughby, and Henry H. Feldstein, Cleveland, Ohio

Application October 6, 1938, Serial No. 233,566

5 Claims. (Cl. 210—200)

This invention relates generally to filters, and more particularly to that type of filter which is known as a rotary leaf pressure filter which comprises generally a horizontally extending substantially cylindrical casing, a shaft extending through and journaled in bearings at the ends of the casing and driven at a comparatively low speed during the filtering operation, and a series of filter leaves mounted upon the shaft and constructed to deliver the filtrate therefrom to the interior of the shaft for discharge thereby outside the casing.

In the operation of filters of this type, the leaves are liable to be injured or broken down, whereby their filtering efficiency is impaired or destroyed, with consequent pollution of the filtrate. It is the general purpose and object of this invention to provide a filter of the general type referred to with means whereby one or more filter leaves which thus may have become ineffective may be identified and the flow of liquid therethrough shut off, and to accomplish this result without the necessity for discontinuing the operation of the filter as a whole, permitting the latter to operate with the omission of the particular leaf or leaves which may have been put out of commission.

A further and more limited object of our invention is to provide a construction of filter which will enable such defective leaf or leaves not only to be identified, but should occasion require, to enable the same to be removed speedily from the filter casing, and replaced by a new filter leaf or leaves.

Further and more limited objects of our invention will be set forth in the ensuing portions of the specification and will be realized in and through the construction shown in the drawings hereof and set forth more specifically in the claims.

Figure 2:
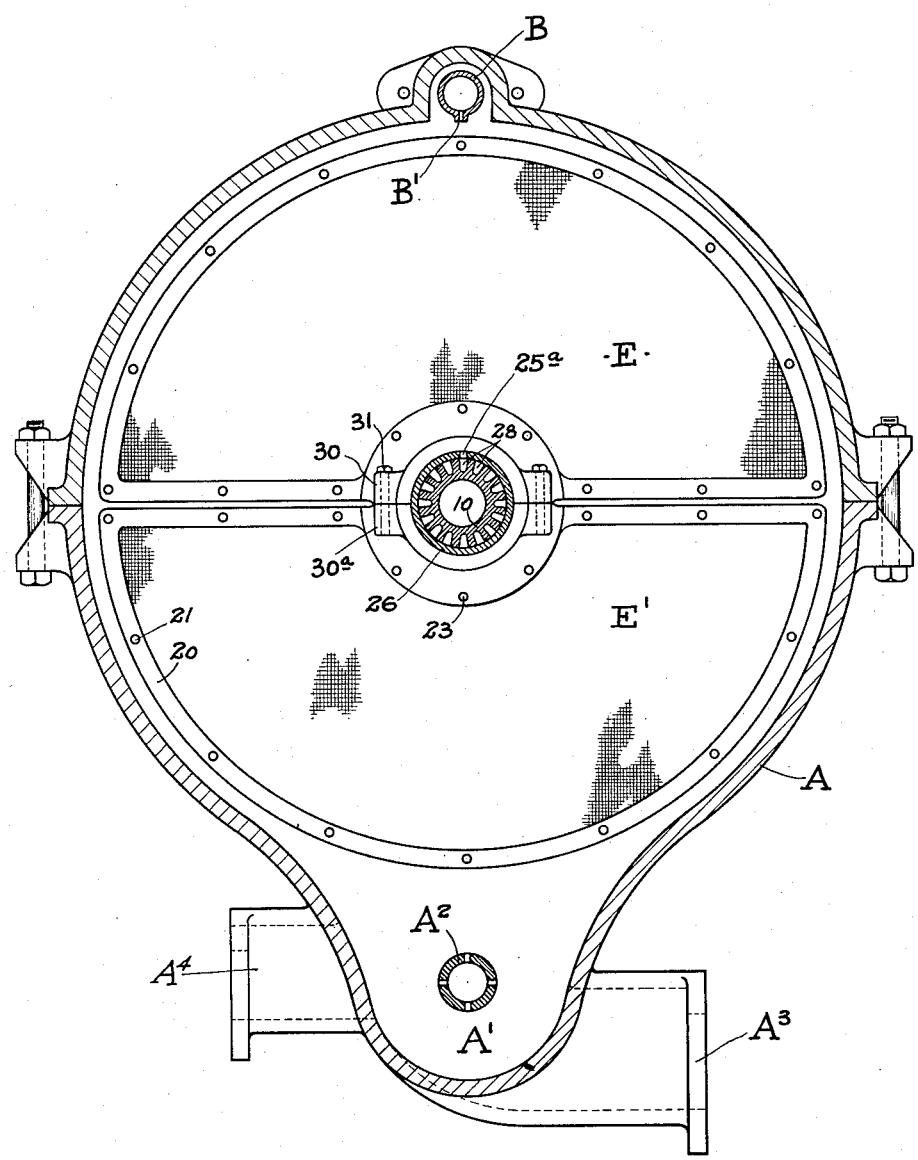
Figure 3:
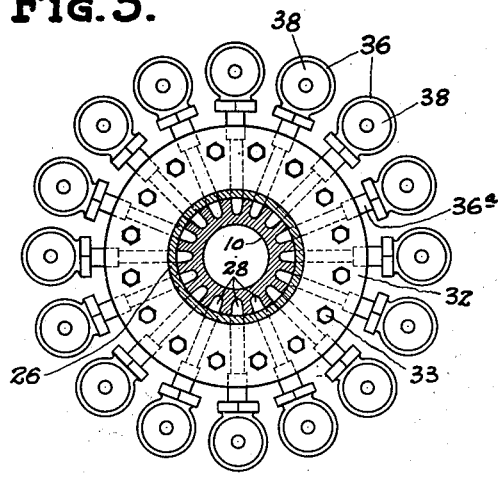
Figure 4:
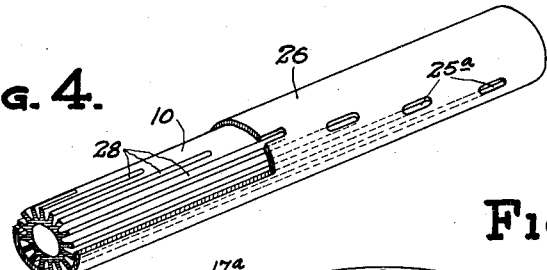
Figure 5:
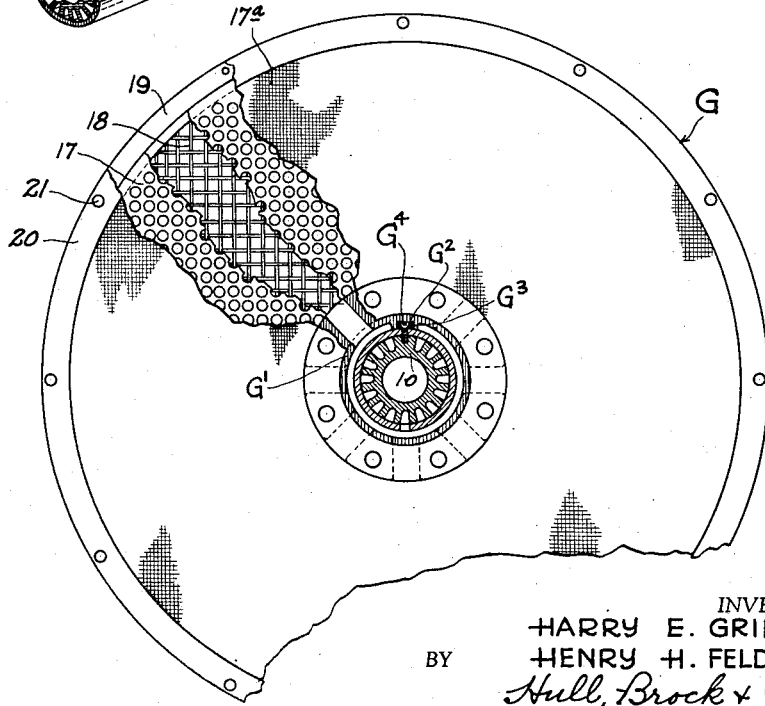

In the drawings, Fig. 1 represents a central longitudinal sectional view through a filter constructed in accordance with our invention, a portion of the shaft and associated leaves thereon and a portion of the casing being broken away due to lack of space and certain other parts appearing in elevation; Fig. 2 is a vertical-section taken on a plane indicated by the line 2—2 of Fig. 1 and looking in the direction of the arrows; Fig. 3 is a sectional view corresponding to the line 3—3 of Fig. 1; Fig. 4 is a fragmentary isometric detail of the shaft and its sleeve portion to clearly illustrate the filtrate delivery channels; Fig. 5 is a vertical cross-section similar to Fig. 2 omitting the casing to illustrate a modification of the filter leaves and the manner of attaching the same to the shaft; Fig. 6 is a fragmentary central longitudinal section showing a modified shaft construction wherein the filtrate delivery channels lead through both ends of the casing to an inspection assembly; Fig. 7 is a fragmentary sectional view on a larger scale of a portion of the shaft and filter leaves in the region indicated by the arcs on Fig. 1 and Fig. 8 is a fragmentary cross-section on an enlarged scale through the shaft and filter leaves as indicated, for instance, by the line 8—8 on Fig. 7.

Describing the various parts illustrated in the aforesaid drawings, and first with particular reference to the form of our invention shown in Figs. 1-4 inclusive, 10 denotes a shaft, which may be solid or hollow, the form shown herein being hollow for purpose of lightness and cheapness of construction. This shaft comprises a central section and extensions $10^a$ and $10^b$ which project through the heads of the casing A and through packing boxes 11 and 12 having followers 13 and 14, respectively, therein and packing 15 and 16. The casing A is of usual construction, comprising an upper semicylindrical section and a lower section, generally semicylindrical in shape, with a trough A' in which a preforated spray pipe $A^2$ is usually mounted for the purpose of facilitating the removal, through the outlet $A^3$, of the carbon, or other material constituting the filter mat, washed from the plates of the filter leaves by the pipe B carried by the upper section and having the spray nozzles B'. The liquid to be filtered is supplied to the trough A' through inlets indicated at $A^4$. The shaft is driven in any conventional manner, being shown herein as provided at one end with a worm wheel C driven by a worm D mounted on a shaft D' which may be supported from the adjacent casing-head by means of a bracket (not shown).

Mounted upon the shaft 10 for rotation therewith are the filter leaves through which the liquid to be filtered is delivered under pressure, while the shaft is rotated, into outlet channels. Each of these filter leaves is of standard construction, insofar as its general construction and the means for removing sediment from the leaves are concerned.

In constructing our filter leaf, we prefer to make each of the same from two semi-circular sections, each section having a semi-cylindrical hub section and the leaf sections being connected through the hub sections so as to form in effect a complete unitary leaf. Except for the fact that each filter leaf shown in Figs. 1 and 2 consists of two sections, the general construction of the leaves is the same as that of the leaves shown in Fig. 5. Each leaf comprises generally a frame consisting of parallel perforated plates 17, with heavy wire mesh 18 therebetween, and filter cloth 17ª outside of said plates 17, the outer edges of the plates being mounted on opposite sides of rings 19 and being secured thereto by clamping rings 20 and bolts 21. The inner edges of the plates of each leaf are mounted in seats provided on opposite sides of circular ribs 22 constituting extensions of the hubs, being secured to such ribs by bolts 23, the said ribs or hub extensions being provided with channels for the delivery of filtrate.

Referring more particularly to the filter-leaf construction shown in Figs. 7 and 8 hereof, the hub portion 24 of one of the filter leaf sections of each pair of said sections is provided with a driving pin 25 which enters a longitudinally elongated slot 25ª in the outer portion of the shaft, said outer portion consisting of a sleeve 26 which is secured to the said shaft so as to form part thereof. The leaf sections, indicated generally at E, E', are provided with outlet ports 27 for delivering the filtrate passing therethrough into a groove extending longitudinally of the shaft 10, the grooves having their radially outer ends closed by the sleeve 26, thereby to produce delivery channels for the filtrate. These channels may be conveniently formed by a milling operation.

In Figs. 7 and 8 the outlet ports of each upper leaf section E are shown as communicating with a single longitudinal channel 28; and the outlet ports of each opposite section E' communicate with this channel by means of a semi-annular passage 29ª provided within its hub section and registering at its opposite ends with a like semi-annular passage 29 in the hub section of the opposite leaf section E. The hub sections are united by means of lugs 30, 30ª and bolts 31.

Where the diameter of the shaft permits, there will be one delivery passage 28 extending from the delivery ports of each filter leaf to a point of observation outside the casing, which will be described hereinafter. However, where the shaft is of such small diameter as to render it impracticable to provide a channel of sufficient capacity for each complete filter leaf, a single channel may be provided for a pair of adjacent filter leaves; or a single channel may be provided for each leaf located on one side of the longitudinal center of the filter casing, said channels extending through one end of the casing, while similar channels, extending in the opposite direction and through the opposite end of the casing, may be provided for the other leaves, as indicated in Fig. 6 hereof.

Each filter leaf or element being provided with its individual outlet channel, we provide means whereby it is possible to ascertain, by observation, whether any particular leaf has become impaired, in whole or in part. For this purpose, in the embodiment of our invention shown in Figs. 1-3 one end of the shaft, including the surrounding sleeve 26, is connected with one end of a delivery chamber F, as by means of a flange 32 secured to the end of the shaft and surrounding sleeve and by bolts 33 securing the flange to the adjacent end wall of the said delivery chamber F. Radial distributing channels 34 are formed between the flange 32 and the end wall 35 of the chamber, the channels 28 communicating respectively with the said distributing channels. A coupling, one for each channel 28 and distributing channel 34, serves to deliver the filtrate into the chamber F. Each coupling comprises a pair of valve bodies 36 connected to each of the channels 34 and to the chamber F by nipples 36ª and 36ᵇ and themselves connected by a sight tube 37 of glass or similar transparent material, each of the valve bodies being provided with a valve 38. The chamber, with the couplings thereon, is provided with a central packing box 39 by means of which the chamber and the shaft connected thereto may be rotatably mounted upon the outlet conduit 40. Each channel 34, sight tube 37 and the connections 36ª, 36ᵇ and either of the valves 38 constitute a delivery conduit for a channel 28 and means for suspending and for controlling the delivery of filtrate through the said conduit.

With the parts constructed and arranged as described, it is believed that the operation will be readily understood. While the filter is being operated, with the valves 38 open, the condition of the filtrate discharged through any single filter leaf or any pair of filter leaves may be readily observed. Should it appear that the filtrate passing through any of the sight tubes 37 is contaminated, the outlet end of the channel 28 from said leaf or leaves can be closed by closing the proper valve 38. In the event that only one, or a small number of leaves (insufficient to make it worth while to shut down the filter for the purpose of removing the injured filter leaves and replacing the same with new ones) are thus cut out, the filter may continue in operation, without contamination of the filtrate. However, should it be desirable to remove the injured or ineffective filter leaves, this result may be accomplished by removing the upper half of the casing A and by removing from the shaft the particular leaves comprising the sections E and E', without the necessity for taking out the shaft.

In Fig. 5 we have shown a modification of the construction of the filter leaves and the manner of mounting the same upon the shaft. In this view, each filter leaf, indicated at G, is of the usual type, comprising a unitary circular ring mounted upon a unitary hub G', the leaves being mounted upon the shaft 10 by providing the hub G' with a keyway G² to receive the key G³ which latter is secured to the shaft sleeve 26 by a plurality of screws G⁴. The leaves will be assembled upon the central shaft section prior to its introduction into the lower portion of the casing, after which the central shaft section will be connected to the end sections in the usual manner and the upper half of the casing secured in place upon the lower section. Each leaf in this embodiment of our invention delivers its filtrate into a discharge channel, each of which channels is preferably formed in the same manner as shown and described in connection with the embodiment of our invention shown in the preceding views.

It will be understood that the delivery ends of the channels will communicate with the same type of inspection assembly as shown in Figs. 1 and 3, whereby the filtrate from each leaf may be inspected and, in the event of injury to any leaf or leaves, the channels leading from the same may be put out of commission.

In Fig. 6, there is shown a further modification of our invention, to which reference has been made hereinbefore and which is particularly adapted for use where the diameter of the shaft is insufficient to enable the discharge channels to be made of sufficient capacity to accommodate all of the leaves mounted upon the shaft. In this form of our invention, all of the leaves on one side of the longitudinal center of the shaft will communicate with the discharge channels 28 leading through one end of the casing to an inspection assembly similar to that employed for all of the discharge channels shown in Fig. 1, while the leaves between the center of the casing and the opposite end will be provided with channels 28a leading in the opposite direction and through the opposite end of the casing and having their delivery ends connected with an inspection assembly similar to the one with which the channels 28 communicate.

Having thus described our invention, what we claim is:

1. In a filter of the character described, the combination of a horizontally extending casing provided with an inlet for receiving under pressure the liquid to be filtered, a shaft extending longitudinally of the casing and supported for rotation, said shaft comprising a central supporting body and a sleeve surrounding the said central body and connected thereto, filter leaves secured to said sleeve, said shaft having channels provided by grooves extending longitudinally of the said central body and spaced circumferentially therearound, the radially outer ends of the said channels being closed by the said sleeve, and the said shaft, including the sleeve and the channels, extending through and beyond an end of the said casing, means placing the interiors of the filter leaves in communication with the respective channels, there being a conduit including inspection means with which the delivery end of each of said channels may communicate, and means for shutting off communication between the delivery end of each channel and its conduit.

2. In a filter of the character described, the combination of a horizontally extending casing provided with an inlet for receiving under pressure the liquid to be filtered, a shaft extending longitudinally of the casing and supported for rotation, said shaft comprising a central supporting body and a sleeve surrounding the said central body and connected thereto, filter leaves secured to said sleeve, said shaft having channels provided by grooves extending longitudinally of the said central body and spaced circumferentially therearound, the radially outer ends of the said channels being closed by the said sleeve, and the said shaft, including the sleeve and the channels, extending through and beyond an end of the said casing, means placing the interiors of the filter leaves in communication with the respective channels, a delivery conduit common to the delivery ends of all of said channels, means independent of one another and including each a sight tube for placing the delivery end of each channel in communication with the said delivery conduit, and means for shutting off communication between the delivery end of each channel and the said conduit.

3. In a filter of the character described, the combination of a horizontally extending casing provided with an inlet for receiving under pressure the liquid to be filtered, a shaft extending longitudinally of the casing and supported for rotation, said shaft having longitudinally extending and circumferentially-spaced channels formed therein, filter leaves each comprising a plurality of segments, each segment being provided with a hub section, means for securing the said hub sections together about the shaft and for effecting a driving connection between each of the said leaves and the shaft, the hub sections each having a channel for receiving filtrate from its filter-leaf segment and the channels in the hub sections of each leaf communicating with one of the longitudinally-extending channels of the shaft, the shaft and the longitudinally-extending channels projecting through an end of the casing, means cooperating with the delivery ends of the said longitudinally extending channels for permitting inspection of the filtrate delivered through each of said channels, and means for suspending the delivery of filtrate through and from each of said longitudinally-extending channels.

4. In a filter of the character described, the combination of a horizontally extending casing provided with an inlet for receiving under pressure the liquid to be filtered, a shaft extending longitudinally of the casing and supported for rotation, said shaft having longitudinally extending and circumferentially spaced channels formed therein, filter leaves each comprising a plurality of segments, each segment being provided with a hub section, means securing the said hub sections together about the shaft and for effecting a driving connection between said sections and the shaft, the said hub sections each having a circumferentially extending channel formed therein and each receiving filtrate from its filter-leaf segment, the channels in said hub sections jointly surrounding the shaft and communicating with one of the longitudinally extending channels of the shaft, the shaft and the longitudinally extending channels projecting through an end of the casing, a delivery conduit common to the delivery ends of all of the said longitudinally extending channels, means independent of one another and including each a sight tube for placing the delivery end of each longitudinally extending channel in communication with said delivery conduit, and means for shutting off communication between the delivery end of each longitudinally extending channel and said outlet.

5. In a filter of the character described, the combination of a horizontally extending casing provided with an inlet for receiving under pressure the liquid to be filtered, a shaft extending longitudinally of the casing and supported for rotation, said shaft having circumferentially spaced channels extending longitudinally thereof and from the central portion thereof toward one end of said shaft, the said shaft also being provided with circumferentially spaced channels extending longitudinally thereof and from the central portion thereof toward the other end of said shaft, the said channels being formed by grooves extending radially inwardly from the outer circumference of the shaft and a sleeve surrounding and closing the radially outer ends of said grooves, filter leaves mounted upon the said sleeve, and the sleeve being provided with openings communicating with the interiors of the filter leaves and with the said channels, and each end of the shaft, together with the channels extending toward such end, projecting through and beyond an end of the casing, and means cooperating with the delivery ends of the said channels for permitting inspection of the filtrate delivered through each of the said channels.

HARRY E. GRILL.
HENRY H. FELDSTEIN.